UNITED STATES PATENT OFFICE.

CHARLES LEE PECK, OF NEW YORK, N. Y., ASSIGNOR TO THE DOW COMPANY, A CORPORATION OF DELAWARE.

SELECTIVE REMOVAL OF ORGANIC MATERIAL FROM LIQUORS.

1,426,596.     Specification of Letters Patent.     Patented Aug. 22, 1922.

No Drawing.     Application filed July 1, 1919. Serial No. 308,052.

*To all whom it may concern:*

Be it known that I, CHARLES LEE PECK, a citizen of the United States, residing at New York city, in the county of New York, State of New York, have invented certain new and useful Improvements in Selective Removal of Organic Materials from Liquors; and I do hereby declare the following to be a full, clear, and exact description of the invention, such as will enable others skilled in the art to which it appertains to make and use the same.

This invention relates to processes of recovering organic material from liquors containing the same, and involves a novel process of selectively removing organic materials of different kinds from a liquor containing such materials. The invention contemplates a method of recovering and collecting organic matters occurring in liquids, or produced therein, and substantially heavier than such liquids, wherein the selective attraction of such organic matters for air or gas bubbles is utilized to produce a flotation and separation of such heavy particles from the surrounding liquid.

I have found that bubbles of various gases, such as air, carbon dioxide, and so forth, in a liquid, have a tendency to adhere to various particles in the liquid and that this tendency is selective as between various kinds of particles. The tendency of the air bubbles to adhere is greater as regards some kinds of particles than others. The tendency of gas bubbles to adhere to organic materials generally is greater than their tendency to adhere to inorganic particles of the character generally found in liquids of the class here under consideration, such as sand, dirt, and so forth. The tendency is selective as between various kinds of organic particles. These facts are utilized in the present invention, and I am enabled to perform a selective flotation of different organic substances from each other, as more fully explained hereinafter.

The waste liquors from many industrial operations contain valuable organic material. This organic material is very often, and, in fact, is usually, of a putrescible character and cannot be directly discharged into streams and rivers without polluting the same. Moreover, the organic material, when isolated from the liquor, is often of commercial value, and to discard it may be an economic waste. The recovery or reclamation of organic material from such waste liquors, is, therefore, not only desirable, and often necessary, for sanitary reasons, but is a profitable operation by reason of the value of the reclaimed product.

The method of the invention is applicable for the treatment of liquors containing organic matter of the protein, hydrocarbon, carbo-hydrate and fat classes. Thus, the liquor may contain flesh, hide substances, hair, bone, ossein, fat, greases, butter, cheese, soap, waxes, resin, gum, rubber, vegetable or mineral oils or tars, or other organic material. The invention may, for example, be advantageously applied to the treatment of the waste liquors of the hide treating art, of the textile and wool washing plants, silk gum liquors, fuller's liquor, laundry waste liquor, oily or tarry water or emulsions, and the like.

In operating under the present invention the solid particles are selectively separated from the liquid by a flotation operation. In many cases where the liquid contains matter in solution which can be rendered insoluble by appropriate treatment, such treatment is resorted to preliminarily to the flotation operation; such matter being insolubilized by coagulation, precipitating, flocculating, agglomerating, or the like, and throughout this specification and the appended claims, I have employed the term "coagulate" and its derivatives, in a generic sense, to cover any operation by which the organic matter is brought into a solid state and made susceptible of flotation. In general, the coagulation contemplated by the present invention converts the organic matter into particles which would normally sink in these liquids.

The organic material may be present in the original liquor as an undissolved solid, or in the form of an emulsion, or in the form of a colloid. If in solution, it may be coagulated by appropriate treatment. Where the organic material exists only in the original liquor in an undissolved state and in a physical condition amenable to flotation, the step of coagulation may, of course, be dispensed with. The coagulation of organic matter may be effected in various ways, as, for example, by the addition of a suitable agent, such as an acid, an alkali, a salt, and so forth. Thus, where the organic matter is in solution, its coagulation can be brought about by the addition of a suitable reagent to effect its precipitation, and in the case of a colloid, any suitable agent or means may be employed to effect the coagulation of the colloid. In any case, the purpose of the coagulation step is to convert the organic matter into a physical state amenable to the flotation treatment.

These two steps of coagulation and flotation may be carried out simultaneously, or in sequence as separate operations. Thus, the organic material may first be coagulated in any suitable manner and the liquor then subjected to a flotation treatment. In general, however, I prefer to carry out the two operations simultaneously. In the flotation operation minute or finely divided gas bubbles are introduced into the liquor carrying suspended solids through a porous bottom of the apparatus, or such bubbles may be formed in the liquid by violent agitation, or in any other way. The coagulating agent may be added directly to the vessel or apparatus in which flotation is produced. The minute gas bubbles attach themselves to the coagulated particles resulting from the action of the coagulating agent and the buoyed solids rise to the surface of the liquid.

In the present invention heavy organic matter is brought to the surface of the liquid by being attached to gas bubbles, which adhere to the particles of organic material, and by their buoyant action, bring such particles to the surface. The flotation treatment of the invention contemplates the removal from liquors containing them of particles of organic matter of greater specific gravity than the surrounding liquid. Such particles would normally sink and settle on the bottom, but as the result of the flotation treatment of the invention, these particles are caused to rise to the surface of the liquid, and are removed therefrom in any suitable manner.

Where the organic particles themselves have a natural selective attraction for air, or the like, no added flotation agent is necessary. Thus, for example, I have found that precipitated soap requires no added flotation agent. Where such an agent is necessary, or desirable, oil, or the like, may be introduced into the liquor. For example, soap may be added to the liquor and collectively taken up by certain organic substances. The organic matter which has taken up the soap may then be selectively floated.

The particles of organic material are maintained during the flotation treatment in a finely divided condition as the result of the aeration. Where the floated matter is to be subsequently dehydrated by filtration, agitation of the liquor during the flotation treatment is desirable. The finely divided particles of organic matter are carried to the surface by the buoyant action of the minute gas bubbles disseminated throughout the liquid. The operation of coagulating the organic material serves the purpose of converting the organic material into a physically solid form suitable for the subsequent flotation treatment. Where the organic material already exists in the liquor in a flotatable physical condition, either as the result of some preceding treatment step, or otherwise, the preliminary operation of coagulation may be dispensed with.

The floated organic matter removed from the liquor may be subjected to any appropriate further treatment for the recovery or production of valuable organic substances. Thus, such matter may be partially dehydrated and treated for the recovery of such fatty materials as it contains, or the matter may be dried and utilized as fertilizing material.

The selectivity of the flotation operation is a distinctive feature of the present invention. I have discovered that the attraction of finely divided particles of different organic materials is selective with respect to the gas bubbles, and this property is used for the selective separation of various kinds of organic substances. Thus, certain organic substances require the presence of a flotation agent, while other organic substances have of themselves a sufficient natural attraction for gas bubbles to effect their flotation, without any additive flotation agent. In such cases, the naturally flotatable substances can first be recovered by flotation, and other organic substances, remaining in the liquor after this first flotation operation, may then be recovered by a second flotation treatment in the presence of an appropriate flotation agent. Moreover, further selectivity may be obtained by the use of various flotation agents, and I have found that certain organic substances may be floated by the use of certain flotation agents, while other organic substances require a different flotation agent to effect their flotation.

As an example of the selective flotation of organic substances in accordance with the present invention, I will mention the waste liquors of the hide treating art. These liquors contain hair, pieces of flesh, hide material, and so forth. The hair, I have found in many cases, is naturally flotatable, and its flotation is effected without the use of a flotation agent. On the other hand, the fleshings and hide particles are not directly flotatable. After the removal of the hair particles by flotation, the fleshings and hide particles are rendered amenable to flotation by the action of insoluble or precipitated soap. The insoluble soap may be precipitated within the liquor or may be added thereto. The insoluble soap acts as a flotation agent, and by attaching itself to the fleshings and hide particles, imparts to the latter an affinity for gas bubbles such as is necessary to effect flotation. The flotation treatment of the present invention, therefore, provides an efficient and economical process for selectively separating the hair from the fleshings and the like, present in tannery waste water.

In general, I have found proteids, precipitated or otherwise, to be non-flotatable, except by specific treatment. The usual flotation agents, such as oil, and the like, are ineffective in the case of proteids, but I have found insoluble or precipitated soap to be a satisfactory flotation agent for the removal by flotation of proteids from liquors containing them. The flotation treatment of the invention, accordingly, provides a method for selectively separating naturally flotatable organic matter, or organic particles coated with hydrocarbon or other flotation agent, from proteids or organic particles or inorganic particles which are not coated with hydrocarbon, and which do not attract or attach themselves to the gas bubbles. Moreover, hydrocarbons themselves, such, for example, as mineral oil, compounds of mineral oils, and the like, can be selectively separated from naturally non-flotatable organic matter by the flotation treatment of the present invention, and such naturally non-flotatable matter may then be rendered amenable to the flotation treatment by the addition of a suitable and appropriate flotation agent, and such matter can then be removed from the liquor by a second flotation treatment.

Where the overflow froth from any flotation operation is to be subjected to a subsequent filtering treatment, such, for example, as a suction filtration, I have found it usually of advantage to employ agitation in connection with the preceding flotation operation. Such agitation may, of course, be in whole or in part relied upon to effect the flotation treatment itself. Agitation during the flotation treatment prevents non-flotatable material from becoming enmeshed in the flotatable material and carried off with the latter. Furthermore, the agitation maintains the flotatable material in a relatively finely divided physical condition, and thus insures its ready filtration in the subsequent treatment of the overflow froth. Without agitation, the flotatable material may be carried to the surface in relatively large masses, in which non-floatable foreign matter is frequently enveloped, and the resulting overflow froth is in such a physical condition that subsequent filtration is extremely difficult, if not practically impossible.

I claim:

1. The method of effecting the selective separation and recovery of hair from tannery liquors or other liquors containing the same in a mixture with fleshings and the like, which comprises subjecting the liquor to a flotation operation and thereby selectively floating the hair without floating the fleshings and the like and recovering the hair thus floated; substantially as described.

2. The method of effecting the selective separation and recovery of hair and fleshings from tannery liquors and the like, which comprises subjecting the liquor to a flotation operation and thereby selectively floating the hair and recovering the same, and subjecting the remaining liquor to a flotation operation in the presence of an insoluble soap and thereby floating the fleshings and recovering the same; substantially as described.

In testimony whereof I affix my signature.

CHARLES LEE PECK.

Certificate of Correction.

It is hereby certified that the name of the assignee in Letters Patent No. 1,426,596, granted August 22, 1922, upon the application of Charles Lee Peck, of New York, N. Y., for an improvement in "Selective Removal of Organic Material from Liquors," was erroneously described and specified as "The Dow Company," whereas said assignee should have been described and specified as *The Dorr Company*, as shown by the records of assignments in this office; and that the said Letters Patent should be read with this correction therein that the same may conform to the record of the case in the Patent Office.

Signed and sealed this 19th day of September, A. D., 1922.

[SEAL.]

WM. A. KINNAN,

*Acting Commissioner of Patents.*